Patented Apr. 7, 1936

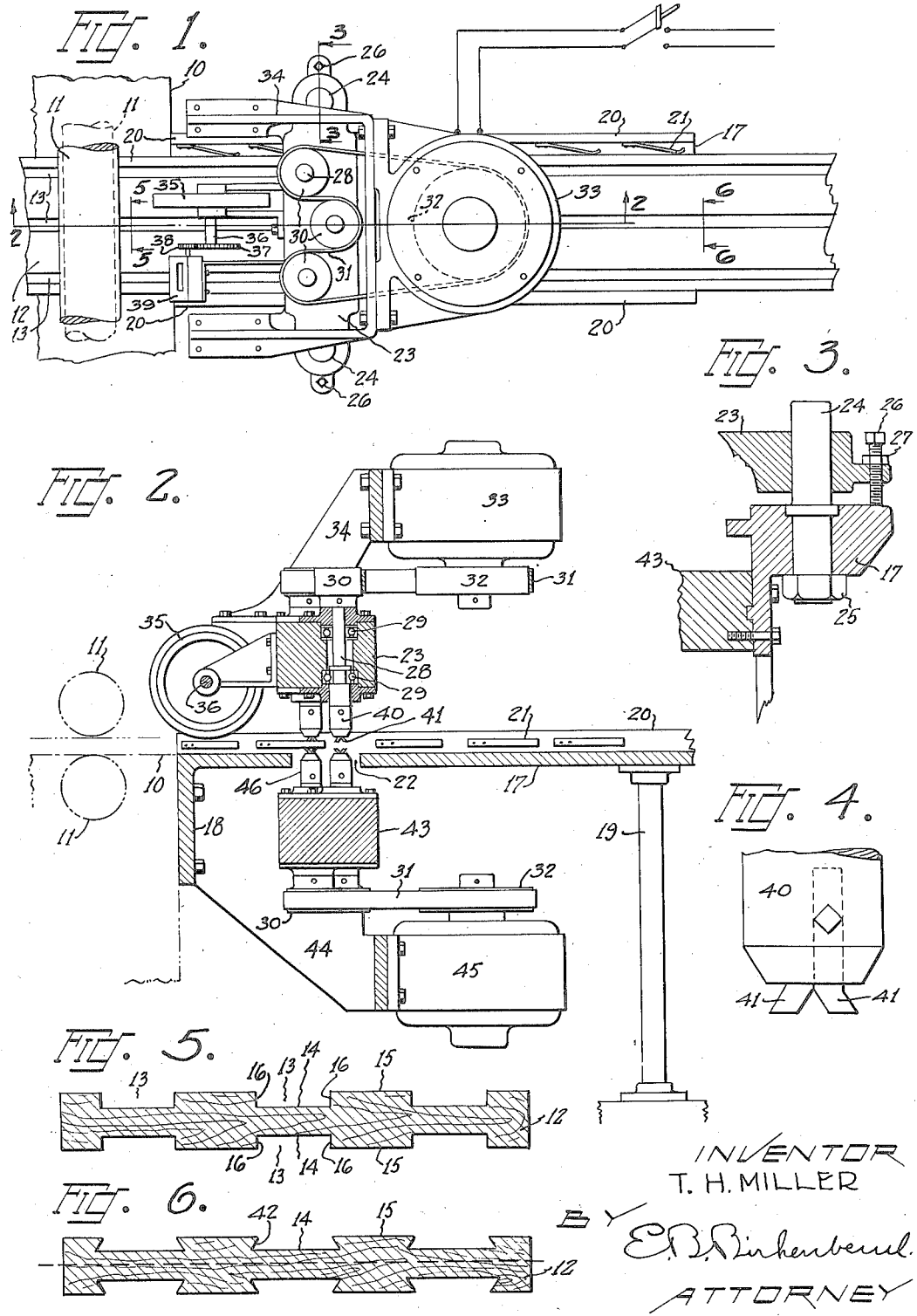

2,036,348

UNITED STATES PATENT OFFICE 2,036,348

DOVETAIL CUTTING MACHINE

Theodore H. Miller, Portland, Oreg.

Application March 12, 1934, Serial No. 715,145

1 Claim. (Cl. 144—87)

This invention relates generally to woodworking machinery, and particularly to a dovetail cutting machine.

The main object of this invention is the provision of a machine for forming longitudinal grooves in the opposite flat sides of boards.

The second object is the provision of a machine which will form dovetail grooves and space them from each other with utmost precision in order that there may be complete interchangeability of parts manufactured thereby.

The third object is to so construct the machine that it may be easily connected to a planer table for the purpose of taking boards as they come from the planer.

These, and other objects, will become more apparent from the specification following as illustrated in the accompanying drawing, in which:

Fig. 1 is a plan of the device.

Fig. 2 is a vertical section along the line 2—2 in Fig. 1.

Fig. 3 is a section taken along the line 3—3 in Fig. 1.

Fig. 4 is an enlarged elevation of a cutter head.

Fig. 5 is a transverse section taken along the line 5—5 in Fig. 1 illustrating a section of board with the channels roughened out on a planer preparatory to entering the dovetail machine.

Fig. 6 is a section taken along the line 6—6 in Fig. 1 showing the appearance of the board after the dovetailing operation is completed and prior to the slitting of the board to one-half its original thickness.

Similar numbers of reference refer to similar parts throughout the several views.

Before entering into a detailed description of this invention it must be understood that the employment of dovetail constructions for uniting pieces of lumber, as well as machines for performing the dovetailing operation have long been constructed. In the machine which I am about to describe the dovetails are longitudinally formed on the opposite sides of a flat board, and the peculiar construction of the machine makes it possible to not only form the dovetails accurately, but to space them with complete uniformity and to perform this operation on opposite sides of the board at the same time; the particular purpose being to prepare the board for a slitting operation in order that the dovetail portions thereof may be brought into engagement with each other, the particular advantages of which will be enumerated in a separately filed application.

Referring in detail to the drawing, there is shown the end of a planer table 10 with its off-bearer rolls 11 by means of which a strip of material 12 is delivered from the planer after having formed therein the channels 13 whose bottoms 14 are parallel with the face 15 of the board 12 and whose edges 16 are normal to the face 15.

Referring particularly to my device same will be seen to consist of a table 17 whose downturned end 18 is attached to the planer table 10 and whose opposite end is supported by the legs 19. Guides 20 insure the correct lateral positioning of the strip 12. Springs 21 urge the strip 12 against a guide 20. A slot 22 is formed in the table 17 between the guides 20.

Above the slot 22 is mounted a vertically adjustable head 23 which guides at each end on an upright pillar 24 whose lower end is secured in the table 17 by means of a nut 25. The head 23 is adjusted vertically by means of the screws 26, and may be held in position by the lock nuts 27.

The head 23 carries three upright spindles 28, one of which is central and the other two of which are spaced equi-distant from the center line, but nearer the planer end of the machine than is the central spindle. Each spindle 28 is supported by the roller bearings 29 and is provided at its upper end by a pulley 30 around which passes a belt 31 which is driven by the pulley 32 on the shaft of the motor 33. The motor 33 is supported by a bracket 34 which is mounted on the head 23.

The head 23 also carries a tracing wheel 35 on whose shaft 36 is mounted a gear 37 which drives the pinion 38 of a counter 39, the purpose of which is merely to indicate the length of the material passing through the dovetailing machine.

On the bottom of each spindle 28 is a head 40 from which project the knives 41 which are ground to accurately form the required groove—that is, that the undercut faces 42 shall maintain a fixed relationship to each other.

On the under side of the table 17 is mounted a head 43 which is identical in nearly every respect with the head 23, except that it is supported directly by the bracket 44 which forms a part of the table 17, and also carries the motor 45. The head 43 carries the heads 46 which are identical with the head 40 and in actual alignment therewith, and differs only therefrom by being turned upward instead of downward.

It can be seen from the foregoing that by the unique arrangement of the spindles 28, the heads 40 and 46 can be spaced as closely as desired and at the same time leaving plenty of room for the driving pulleys 30.

While it would be possible to remove the entire material from the channels 13 by means of the knives 41, it is found more practical to do the bulk of this work on the planer, using my machine only for the undercutting operation which can thereby be speeded up to match the planer speed, and by operating on both sides of the board at the same time as it emerges from the planer it is now ready for the subsequent operations of which only the slitting operation will be referred to here.

Obviously, if longitudinal dovetail boards selected at random are to be satisfactorily assembled it is imperative that the size and shape of each channel, as well as the lateral spacings thereof, be extremely accurate.

With the machine herein described once the machine is constructed it is not possible to vary the lateral spacing of the grooves, and all that the workman has to do is to see to it that the width of the individual groove lies between acceptable limits.

I claim:

A dovetail cutting machine comprising a table including longitudinal guides between which a board may be passed while same is being dovetailed longitudinally on its flat sides, said table having an opening therein between said guides, transversely disposed dovetail cutters occupying a staggered relationship to each other in which the axis of each cutter is in alignment with the axis of the opposite cutter, motors supported above and below said table, and a belt drive for connecting each motor to the cutters on its respective side of the table.

THEODORE H. MILLER.